United States Patent [19]

Elliott, Jr. et al.

[11] 4,243,116

[45] Jan. 6, 1981

[54] FAIL-SAFE MECHANISM FOR GENERATING A PULSE INDICATING THE PRECISE MOMENT OF FIRING OF AN AIR GUN

[75] Inventors: Lloyd E. Elliott, Jr.; John L. Hudson, both of Houston, Tex.

[73] Assignee: Texaco Inc., White Plains, N.Y.

[21] Appl. No.: 59,792

[22] Filed: Jul. 23, 1979

Related U.S. Application Data

[63] Continuation-in-part of Ser. No. 913,764, Jun. 8, 1978, abandoned.

[51] Int. Cl.³ .......................... G01V 1/38; G01V 1/14
[52] U.S. Cl. ................................. 181/118; 73/304 R; 340/603; 222/47; 181/120
[58] Field of Search ............... 181/107, 110, 113, 115, 181/118, 120; 73/304 R; 340/603, 605; 222/47

[56] References Cited

U.S. PATENT DOCUMENTS

| | | | |
|---|---|---|---|
| 3,206,615 | 9/1965 | Paente | 73/304 R |
| 3,687,218 | 9/1972 | Ritter | 181/107 |
| 3,855,861 | 12/1974 | Zimmermann et al. | 73/304 R |
| 3,985,199 | 10/1976 | Baird | 181/107 |
| 4,019,067 | 4/1977 | Gladstone | 73/304 R |
| 4,047,591 | 9/1977 | Word et al. | 181/107 |
| 4,099,406 | 7/1978 | Fulherson | 73/304 R |
| 4,106,585 | 8/1978 | Huizer | 181/120 |
| 4,141,431 | 2/1979 | Baird | 181/110 |
| 4,165,509 | 8/1979 | Betts et al. | 73/304 R |

OTHER PUBLICATIONS

Kolojiwczak, "Stagray System Improved Primary Pulse/Bubble Ratio in Marine Exploration", 5/8/74, pp. 801–808, Offshore Technology Conference, vol. I, OTC 2020.

Primary Examiner—Nelson Moskowitz
Attorney, Agent, or Firm—Carl G. Ries; Robert A. Kulason; Theron H. Nichols

[57] ABSTRACT

A new circuit is added to an electrical circuit including two electrodes underwater positioned very close to an air gun gaseous exhaust wherein the exhaust from the firing air gun momentarily blows away the conductive sea water from one or both of the electrodes to produce a high voltage pulse due to the large increase in resistance in the circuit indicating the precise moment of firing of the air gun free of any uncertainty and mechanical noise which normally affects conventional transducers.

This new circuit added to the above circuit is a circuit polarity reversing circuit which includes particularly a positive current generator, a negative current generator, and a sea ground for forming a third electron source when any of the two electrodes becomes defective, thus forming a fail-safe system. Further, the resultant circuit changes polarity of the electrodes after each firing of the air gun and periodically reverses the current to the electrodes for reduced plating action on the electrodes and for reduced cross coupling between other channels.

17 Claims, 2 Drawing Figures

IMPULSES TO AIRGUN FIRING SYNCHRONIZING SYSTEM

FAIL-SAFE MECHANISM FOR GENERATING A PULSE INDICATING THE PRECISE MOMENT OF FIRING OF AN AIR GUN

This is a Continuation-in-Part of Ser. No. 913,764, filed June 8, 1978, now abandoned.

BACKGROUND OF THE INVENTION

Marine seismic operations utilizing multiple air guns require means for precisely synchronizing the release of energy from each gun in order to optimize the composite acoustic pulse. A primary requirement of any synchronizing control system is means for detecting the exact time at which air is released from each gun for forming a seismic acoustical energy pulse.

The high pressures and adverse mechanical operating conditions prevailing in the proximity of marine air gun energy sources to delineate the sedimentary section below greatly reduce the reliability of conventional transducers such as hydrophones, accelerometers or pressure detecting devices which might be employed to detect the instant of energy release for recording on the seismic record, such as the acoustical to electrical converter disclosed in U.S. Pat. No. 3,496,532.

We have invented a practical and reliable means for detecting the air released from the guns or the instantaneous beginning of the seismic energy pulse.

The electrical event which results from circuitry arranged to detect this instant and momentary change of resistance is essentially free from uncertainty and mechanical noise which normally affects conventional transducers.

Conventional air guns used as a submerged seismic energy source are illustrated in U.S. Pat. Nos. 3,379,273, 3,653,460, 3,923,122 and 4,141,431. Likewise, in a typical synchronized seismic exploration system as illustrated in U.S. Pat. No. 3,496,532, a seismic stream cable is towed through the water to detect the acoustic reflection waves in the water generated by the detonation of the charge for converting the received reflected acoustic waves and convert them into corresponding electrical signals for the recording and processing apparatus. Thus, in the present day equipment, the time lost, as the few milliseconds travel time through the water between the air gun and the weaving towed sound detector a few yards or meters away has to be tolerated. Since typical velocity of sound in water is 5,000 ft./sec., the travel time to a detector towed, say 10 feet away from an air gun would be 2 milliseconds.

In systems like that disclosed in U.S. Pat. No. 4,141,431, plating takes place on one of the electrodes after several firings of the air gun, and cross coupling results between channels. Also, a fail-safe system is lacking in the above patent since if either electrode became defective, the system would fail to operate.

OBJECTS OF THE INVENTION

Accordingly, a primary object of this invention comprises providing a fail-safe air gun firing detection system that operates when either one of the two electrodes are defective.

Another object of this invention is to provide an air gun firing detection system that reduces the plating action of the electrodes and for reducing cross coupling between other channels.

A further object of this invention is to provide a fail-safe mechanism for indicating the precise momeent of firing of an air gun that is easy to operate, is of simple configuration, is economical to build and assemble, and is of greater efficiency for producing the exact time of firing of the air gun for extreme accuracy of synchronization in the seismic record.

Other objects and various advantages of the disclosed fail-safe mechanism for detecting the precise amount of firing of an air gun will be apparent from the following detailed description, together with the accompanying drawing, submitted for purposes of illustration only and not intended to define the scope of the invention, reference being made for that purpose to the subjoined claims.

BRIEF DESCRIPTION OF THE DRAWING

The drawing diagrammatically illustrates by way of example, not by way of limitation, one form of the invention wherein like reference numerals designate corresponding parts in the several views in which.

The invention disclosed herein, the scope of which being defined in the appended claims is not limited in its application to the details of construction and arrangement of parts shown and described, since the invention is capable of other embodiments and of being practiced or carried out in various other ways. Also, it is to be understood that the phraseology or terminology employed here is for the purpose of description and not of limitation. Further, many modifications and variations of the invention as hereinbefore set forth will occur to those skilled in the art. Therefore, all such modifications and variations which are within the spirit and scope of the invention herein are included and only such limitations should be imposed as are indicated in the appended claims.

Figure 1:
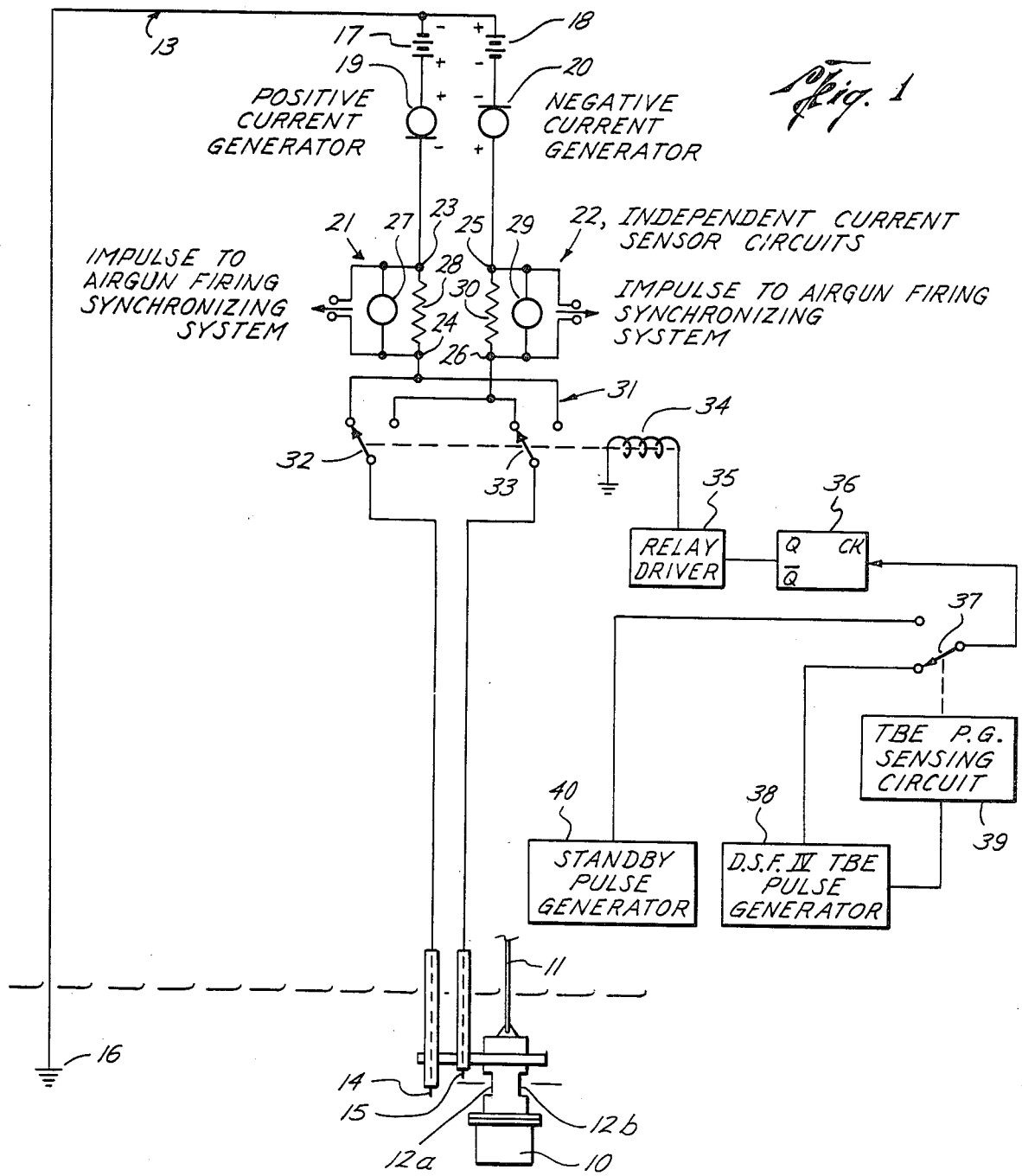
FIG. 1 is a schematic diagrammatic elevation view of the complete mechanism including the novel circuitry.

FIG. 1 illustrates a seismic pneumatic energy source, such as but not limited to, a submerged air gun 10 supported with a line 11 from a boat (not shown) above. The air gun 10 has exhaust ports 12a and 12b. While several air guns and circuits may be utilized with the new concept disclosed hereinafter, only one air gun and one circuit therefor is disclosed for clarity of disclosure in the delineation of the sedimentary section below.

FIG. 1 also illustrates the novel circuit 13 for powering the two electrodes 14 and 15. This new circuit comprises a sea ground 16, having a direct current electrical source 17 and 18 and a positive current generator 19 and a negative current generator 20, each connected to independent current sensor circuits 21 and 22, respectively. Both detectors 21 and 22 have pairs of output contacts 23, 24 and 25, 26, respectively, for transmission of signal pulses to an air gun firing synchronizing and record system (not shown). Current sensor 21 comprises a voltage meter 27, and a resistor 28. A current sensor 22 similarly includes a voltage meter 29 and a resistor 30.

A gun, switch 31 is connected between the independent current sensor circuits 21, 22 and the two electrodes 14, 15. Switch 31 comprises relay contacts 32 and 33 operated by relay 34, which relay is driven by relay driver 35 responsive to flip-flop clock 36. In normal operation electronic switch 37 connects flip-flop clock 36 to the digital field system time break enable pulse generator 38 which supplies power to relay driver 35 for energizing a relay 34 which operates switch 31 which switches the polarity of the current supplied to each of the electrodes.

If no shots are fired in a pre-selected period of time, then the T.B.E. (Time Break Enable) pulse generator sensing circuit 39 operates electronic switch 37 so that 40 can supply voltage pulses to the flip-flop clock 36 which causes the polarity of the current supplied to electrodes 14 and 15 to change during extended periods of time when no air gun shots are being fired. Switch 37 may be switched electronically, or manually to either standby pulse generator 40 or D.F.S. IV (Digital Field System) T.B.E. pulse generator for supplying the triggering pulses to flip-flop 36 which supplies the control voltage to relay driver 35 which in turn supplies the power to relay 34 which controls the polarity of the current signals supplied to electrodes 14 and 15.

The electrodes 14 and 15 protrude through and are secured to a flange on the top of the air gun 10 to position them very close to or contiguous to one of the air gun exhaust ports 12a to ensure that the first portion of the acoustical wave or initial blast of exhaust gases from the air gun exhaust port blows the water away from between the electrodes 14 and 15. The sea ground 16 acts electrically as a third electrode. The term "very close to" meaning, for example, a distance or less than one inch (within 2.54 cm.) or as close as mechanically and economically possible. Thus the time lag between the time when the pulse generating air bubble emerges from the air gun exhaust port and the time that the synchronizing system receives the electrical pulse is the time it takes for the air bubble to travel from the exhaust port to the position between the two electrodes added to the time it takes for the electrical voltage pulse to travel from the output terminals to the synchronizing record system.

Figure 2:
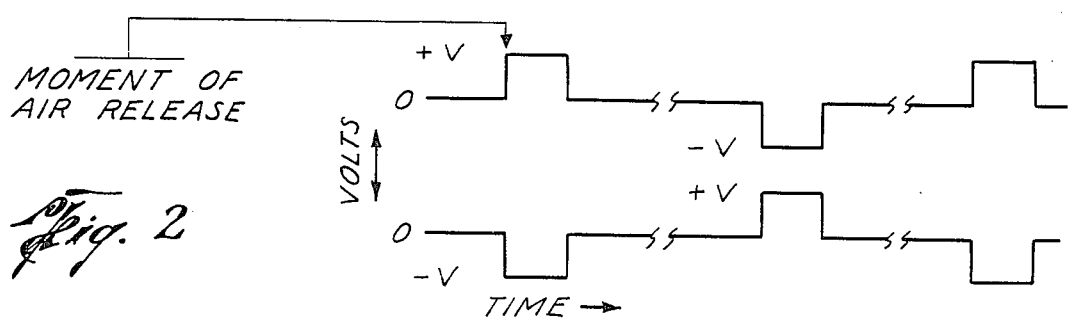
FIG. 2 is a time versus voltage output curve of the disclosed system.

FIG. 2, a time versus voltage output curve shows two typical simultaneous, positive and negative voltage pulses at the moment of air release from the air gun for being transmitted to the air gun firing synchronizing system. FIG. 2 illustrates the voltage, potential at the two electrodes relative to sea ground.

Thus briefly in operation of the embodiment of FIG. 1, the low interelectric voltage exists due to the current flowing in the circuit when the two electrodes 14 and 15 are submerged in the sea water and positioned very close to the air gun, and with the sea water completing the circuit and creating a low resistance between the two electrodes. Also, the sea ground 16 completes the circuit for causing a flow of electrons to both circuits 21 and 22. Upon firing of the air gun, the first acoustical wave or blast of the exhaust gases displaces the water with air from between the two electrodes momentarily. At the moment of insertion of a high resistance to current flow between the electrodes, is generated on each electrode which indicate a voltage pulse the precise moment of firing of the air gun and these voltage pulses are transmitted to the airgun synchronizing and recording systems, for example.

When an air gun 10 fires and opens the seashort or current path between the electrodes 14 and 15, this induces two impulses to the air gun firing synchronizing system (not shown).

After the air bubble has dissipated which takes a short period of time indicated by the length of the pulse in FIG. 2 after the moment of release, the current path between the electrodes 14 and 15 is again closed.

Prior to the next air gun shot the Digital Field System Model #IV (by Texas Instruments, Inc., Houston, Texas), T.B.E. (Time Break Enable) standby pulse generator 38 generates a pulse to switch 37 and through to flip-flop clock 36 which causes the relay driver 35 to switch relay 34 to a different state and thus actuating switches 32 and 33 for reversing the polarity of the electrodes 14 and 15.

Or after a predetermined period of time has passed when the air gun has not fired, T.B.E.P.G. (Time Break Enable Pulse Generator) sensing circuit 39 detects no firing within this predetermined time period and actuates switch 37 to the standby pulse generator 40. Being that pulse generator 40 generates pulses on a regular basis at short predetermined time periods, it generates pulses to flip-flop clock 36 which reverses the state of polarity of the relay driver 35 which actuates relay 34 for changing the position at switches 32 and 33 reversing the polarity of the currents supplied electrodes 14 and 15.

The results are:
1. Less plating action on the electrodes.
2. Reduced noise and cross coupling between other channels due to equal and opposite polarity contents being supplied to the electrodes 14 and 15.
3. A more reliable fail-safe system due to the use of a third electrode or sea ground 16 as a backing electrode when any one of the two normal electrodes, 14 and 15, fail.

Accordingly, it will be seen that a mechanism has been disclosed for generating a pulse indicating the precise moment of firing of an air gun, and it will operate in a manner which meets each of the objects set forth hereinbefore.

While only one mechanism for carrying out the invention has been disclosed, it will be evident that various modifications are possible in the arrangement and construction of the disclosed mechanism without departing from the scope of the invention and it is accordingly desired to comprehend within the purview of this invention such modifications as may be considered to fall within the scope of the appended claims.

We claim:
1. A mechanism for generating a plurality of pulses indicating the precise moments of firing of an air gun for a seismic record comprising,
 (a) circuit means for generating a current to two closely spaced apart electrodes submerged underwater very close to an air gun means exhaust port,
 (b) said circuit means including a polarity reversing circuit means connected to a sea ground as a backup electrode when any one of the two electrodes become defective, and
 (c) said circuit means being responsive to said polarity reversing circuit means for periodically reversing said current to said two electrodes after a predetermined period of time for reducing plating action on the electrodes; for reducing cross coupling between other channels, and for providing a fail-safe system.
2. A circuit as recited in claim 1 wherein,
 (a) said circuit means is responsive to said polarity reversing circuit means when fired for reversing said current to said two electrodes for reducing plating action on the electrodes.
3. A circuit as recited in claim 1 wherein,
 (a) said circuit means is responsive to said polarity reversing circuit means for changing the polarity of the two electrodes after each firing of the air gun for reducing the plating action of the current flow on the electrodes.

4. A circuit as recited in claim 1 wherein said polarity reversing circuit means comprises at least,
   (a) gang switch means responsive to a relay driven means for switching said electrodes between positive and negative current generator circuits.

5. A circuit as recited in claim 1 wherein said polarity reversing circuit means comprises at least,
   (a) two independent current sensor circuit means responsive to firing of the air gun for monitoring the pulses in the circuit due to the momentary increase in resistance in the circuit between said two electrodes.

6. A circuit as recited in claim 1 wherein said polarity reversing circuit means comprises at least,
   (a) positive current generator means and negative current generator means for generating a positive current to one of said electrodes and a negative current to the other of said electrodes, respectively.

7. A circuit as recited in claim 1 wherein said polarity reversing circuit means comprises at least,
   (a) relay driven means responsive to a flip-flop clock for operating a gang switch for switching said electrodes between positive and negative current generator circuits.

8. A circuit as recited in claim 1 wherein said polarity reversing circuit means comprises at least,
   (a) flip-flop clock means responsive to a pulse generator means for counting and storing the exact time of passing of each firing of the air gun.

9. A circuit as recited in claim 1 wherein said polarity reversing circuit means comprises at least,
   (a) digital field system pulse generator means for generating a signal pulse for reversing said current to said two electrodes.

10. A circuit as recited in claim 1 wherein,
    (a) said polarity reversing circuit means comprises two interconnected switches in the circuit between said two electrodes and two independent current sensor circuits, and
    (b) positive and negative current generators between said independent current sensor circuits and sea ground for reducing plating action of the currents on the electrodes.

11. A circuit as recited in claim 1 wherein said circuit means includes the following connected in series,
    (a) a low inter-electrode resistance formed by said two submerged electrodes in the circuit separated by water,
    (b) switch means for switching current from one electrode to the other electrode,
    (c) independent current sensor circuit means for monitoring a very low voltage across the electrodes as an electrical current flows in the series circuit under static conditions, and
    (d) positive and negative current generator means connected between said independent current sensor circuit means and sea ground.

12. A circuit as recited in claim 1 wherein upon firing of said air gun said circuit means includes the following connected in series,
    (a) a high inter-electrode resistance formed by said two submerged electrodes separated by air from the air gun,
    (b) switch means for switching the current from one electrode to the other electrode, after each firing, and,
    (c) independent current sensor circuit means for monitoring a high impulse of voltage across the electrodes as electrical current flows in the series circuit for generating the voltage pulse indicating the precise moment of firing of the air gun for the seismic record.

13. A circuit means for generating a plurality of pulses indicating the precise moment of firing of an air gun for a seismic synchronizing system comprising the following in series,
    (a) positive and negative current generator means connected between two submerged electrode means separated by water positioned very close to an air gun means exhaust port for generating a current in one direction to each of said electrode means,
    (b) polarity reversing circuit means,
    (c) independent current sensor circuit means for monitoring the very low voltage across the electrodes as electrical current flows in the series circuit means under static conditions, and
    (d) the current to said two submerged electrode means being responsive to said polarity reversing circuit means for being reversed after each firing for reducing the plating action of the current in said electrodes.

14. A circuit as recited in claim 13 wherein,
    (a) said water separating said two submerged electrode means being blown away and replaced with the exhaust gases from the air gun upon firing thereof for generating a high inter-electrode resistance.
    (b) said independent current sensor circuit monitoring means being responsive to said two submerged electrode means with the gases between the two electrodes for generating a high voltage pulse in the circuit for indicating the precise moment of firing of the air gun for the seismic synchronizing system,
    (c) positive and negative current generator means connected between said independent current sensor circuit and sea ground, and
    (d) the current to said two submerged electrode means being responsive to said polarity reversing circuit means for being reversed after each firing for reducing the plating action of the currents in said electrodes.

15. A circuit as recited in claim 13 wherein upon firing of the air gun and the exhaust gases have blown away and replaced at least a portion of the water between the submerged electrodes momentarily, the circuit being modified as follows,
    (a) said two submerged electrode means being separated by gases forming a high inter-electrode resistance in said circuit in place of said low inter-electrode resistance, and
    (b) said independent current sensor circuit monitoring means being responsive to said two submerged electrode means for generating the high inter-electrode resistance for signaling the precise moment of firing of the air gun for the seismic record.

16. An improved air gun in a seismic recording system comprising,
    (a) air gun means having an exhaust port means, (b) electrical circuit means including two closely spaced apart positive and negative electrodes submerged underwater very close to said exhaust port means and including a sea ground as a third backing electrode when any one of said two electrodes becomes defective, (c) polarity reversing circuit means in said electrical circuit means, said polarity reversing circuit means having positive and negative current generators connected between sea ground and said two electrodes, and (d) said electrical circuit means being responsive to said polarity reversing circuit means upon firing a burst of gas from said exhaust port means for generating a voltage impulse in the seismic recording system for indicating the precise moment of firing of said air gun and for reversing the polarity of said electrodes after each firing for reducing plating action of the current in the electrodes, for reducing cross coupling between other channels, and for providing a fail-safe system.

17. An improved fail-safe air gun as recited in claim 1 wherein said circuit means includes the following connected in series, (a) a low inter-electrode resistance formed by said two submerged electrodes in the circuit separated by water, (b) switch means for switching current from one electrode to the other electrode, (c) polarity reversing current generator circuit means in said electrical circuit means between said two electrodes and sea ground so that said sea ground becomes a third electron source, and (d) said electrodes being responsive to said polarity reversing current generator circuit means for receiving current flow from the sea ground to the negative electrode when said positive electrode is defective and for receiving current flow from the sea ground to the positive electrode when said negative electrode is defective.

* * * * *